No. 611,466. Patented Sept. 27, 1898.
H. P. DAVIS & F. CONRAD.
ALTERNATING CURRENT MEASURING INSTRUMENT.
(Application filed May 7, 1898.)
(No Model.) 4 Sheets—Sheet 1.

WITNESSES: INVENTORS
James B Young Harry P. Davis
H. C. Tener Frank Conrad
BY
Wesley G. Carr
ATTORNEY.

No. 611,466. Patented Sept. 27, 1898.
H. P. DAVIS & F. CONRAD.
ALTERNATING CURRENT MEASURING INSTRUMENT.
(Application filed May 7, 1898.)
(No Model.) 4 Sheets—Sheet 2.

No. 611,466. Patented Sept. 27, 1898.
H. P. DAVIS & F. CONRAD.
ALTERNATING CURRENT MEASURING INSTRUMENT.
(Application filed May 7, 1898.)
(No Model.) 4 Sheets—Sheet 3.
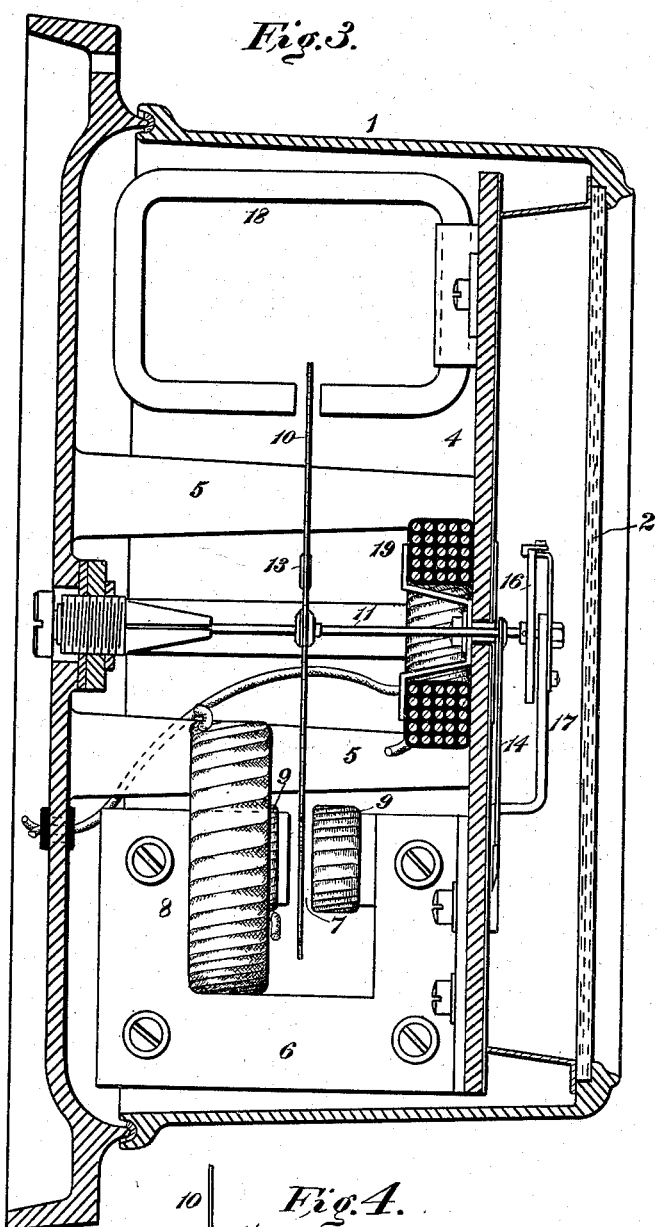
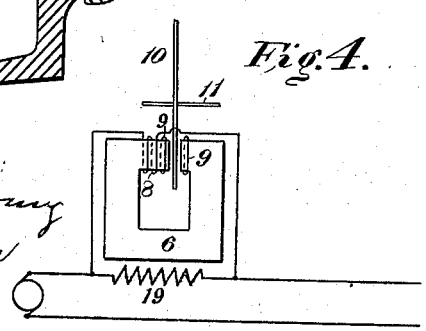
WITNESSES:
INVENTORS
Harry P. Davis
& Frank Conrad
BY
Wesley G. Carr
ATTORNEY.

No. 611,466. Patented Sept. 27, 1898.
H. P. DAVIS & F. CONRAD.
ALTERNATING CURRENT MEASURING INSTRUMENT.
(Application filed May 7, 1898.)
(No Model.) 4 Sheets—Sheet 4.

WITNESSES:
INVENTORS
Harry P. Davis
& Frank Conrad
BY
Wesley G. Carr
ATTORNEY

UNITED STATES PATENT OFFICE.

HARRY P. DAVIS, OF PITTSBURG, AND FRANK CONRAD, OF WILKINSBURG, PENNSYLVANIA, ASSIGNORS TO THE WESTINGHOUSE ELECTRIC AND MANUFACTURING COMPANY, OF PENNSYLVANIA.

ALTERNATING-CURRENT-MEASURING INSTRUMENT.

SPECIFICATION forming part of Letters Patent No. 611,466, dated September 27, 1898.

Application filed May 7, 1898. Serial No. 680,035. (No model.)

*To all whom it may concern:*

Be it known that we, HARRY P. DAVIS, residing at Pittsburg, and FRANK CONRAD, residing at Wilkinsburg, in the county of Allegheny and State of Pennsylvania, citizens of the United States, have invented a new and useful Improvement in Alternating-Current-Measuring Instruments, (Case No. 778,) of which the following is a specification.
Our invention relates to electrical measuring instruments for alternating currents or electromotive forces, and particularly to instruments of this class that indicate either the current or the electromotive force traversing the circuits with which they are connected at any given instant as distinguished from such instruments as effect either a registration or a record of the total current or electromotive force traversing such circuits during the time the instruments are in service.

Figure 1:
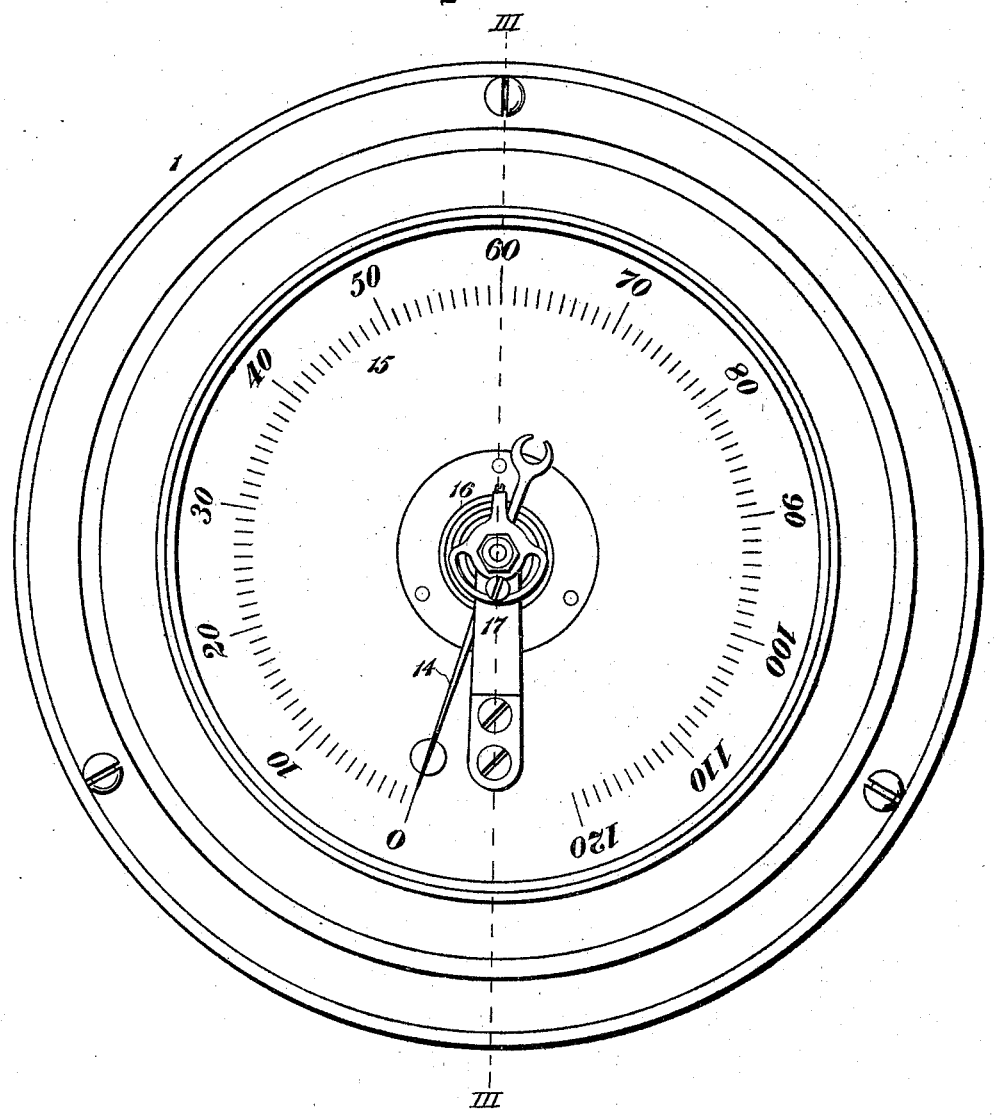
Figure 2:
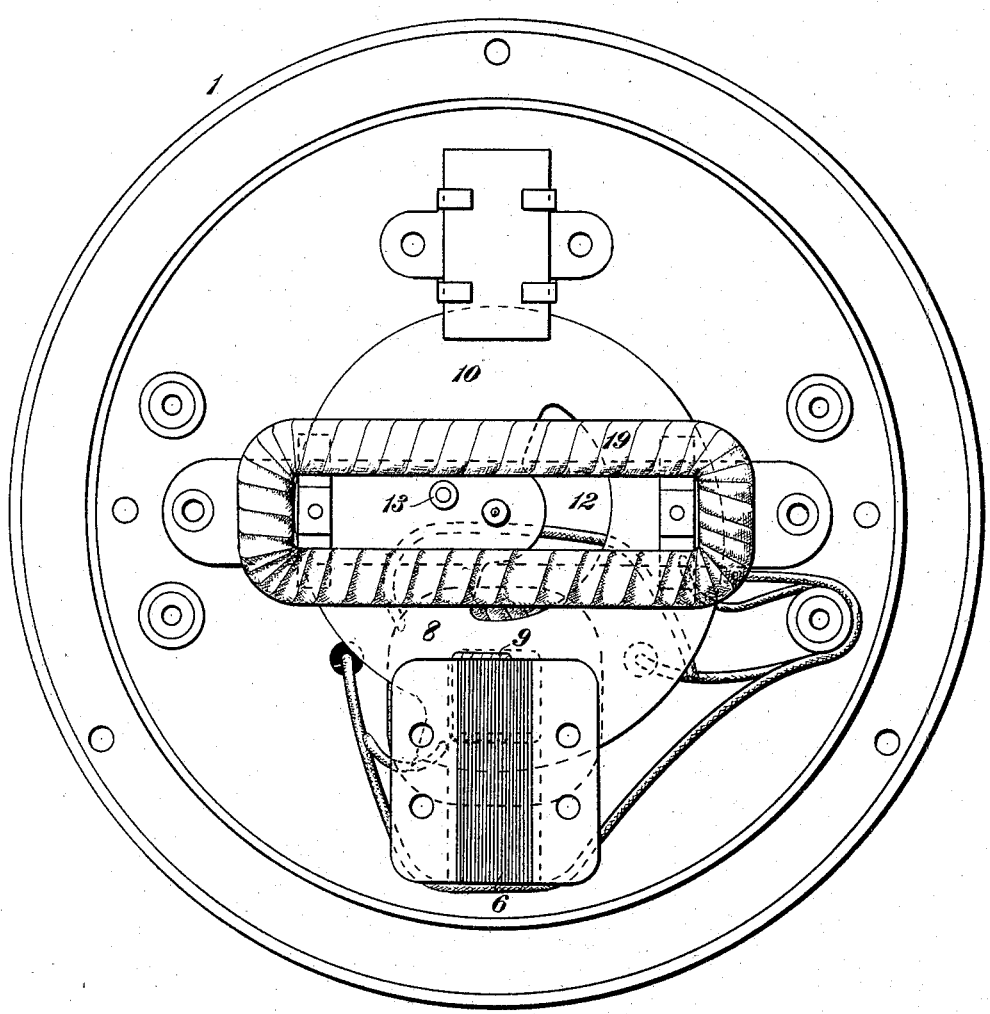
Figure 5:
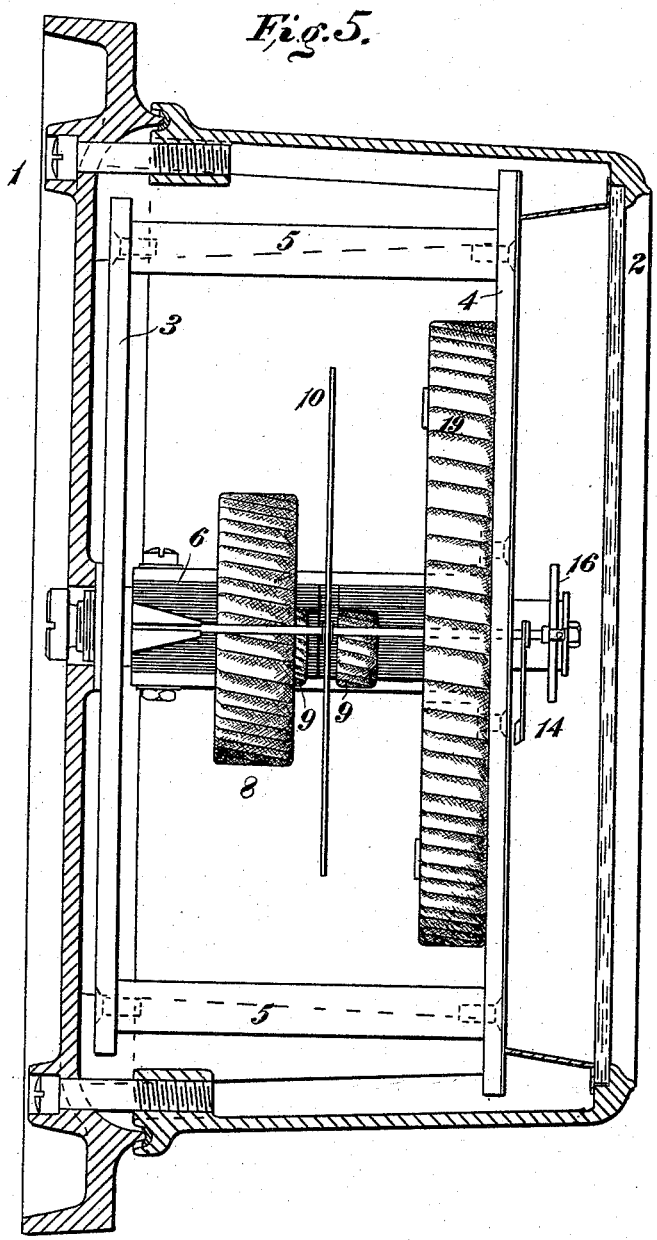

The object of our invention is to provide an instrument of the character indicated which shall be simple and compact in construction and accurate in operation and which shall have a wide range of movement and be adapted to accurately indicate the current or the electromotive force in any alternating-current circuit irrespective of the frequency of alternations and changes in temperature.
In the accompanying drawings, Figure 1 is a plan view or a front elevation, according as the instrument is a portable or a switchboard instrument; and Fig. 2 is a corresponding view, the cover-plate and indicating devices being removed. Fig. 3 is a view partially in section and partially in side elevation, the section being taken on line III III of Fig. 1. Fig. 4 is a diagram of the circuits of the instrument when the coils are wound and connected so as to measure the amount of current flowing in the circuit with which they are connected. Fig. 5 is a view partially in section and partially in either plan or side elevation, according as the instrument is a switchboard or a portable instrument, the section being taken at right angles to that of Fig. 3.

Referring now particularly to the details of construction illustrated in the drawings, 1 is an inclosing case or box for the operating parts of the instrument, this case being provided with a glass front 2, the sides and back being made of metal, glass, or wood, or a combination of these materials, according to the desires of the manufacturer and the place in which the instrument is to be used.

The operating parts of the instrument are mounted upon and supported by an interior framework consisting of a back plate or bar 3, a front plate 4, and connecting-posts 5.

6 is a laminated core having an air-gap 7.

8 is the primary actuating-coil of the instrument, located upon one arm of the core 6 and connected to the circuit the current or electromotive force of which it is desired to measure.

Mounted upon each arm of the core and adjacent to the air-gap 7 is a coil 9, that is closed upon itself. One side of each coil 9 is located in a slot in the core, so that the magnetic field due to the current set up in these coils is displaced with reference to the field set up by the current passing through the coil 8, and inasmuch as the currents in the coils 9 are produced by induction from the current in the coil 8 there will also be a displacement of phase, and a shifting magnetic field will result.

It will be understood that the invention is not limited to the employment of two coils 9, since the instrument would be operative and useful with only one such coil.

The armature or secondary member of the motor device consists of a disk 10, the periphery of which has the form of one turn of a spiral, as is clearly indicated in Fig. 2 of the drawings. By reason of this construction the disk will project into the air-gap 7 a maximum distance when the disk is at its initial or zero position—that is, when there is no current flowing through the coil 8. As the current or the electromotive force, as the case may be, increases through the coil 8 the armature will be rotated in a clockwise direction by reason of the action of the shifting magnetic field, and as each succeeding point in the disk has a radius of less length than the preceding one the degree to which the armature projects into the air-gap will decrease. This construction of armature enables us to provide an instrument having a uniform scale and one which will accurately indicate the current or the electromotive force, as the case may be, in the circuit.

If a circular disk were employed, the torque exerted upon it would be proportional to the square of the current, whereas a torque proportional to the current is desired in order that the meter may be a direct-reading instrument—i. e., one in which the torque shall be directly proportional to the current. We secure this result by making the disk of such shape that its degree of projection between the poles of the magnet will decrease as it moves away from the initial or zero position.

The armature 10 is rigidly mounted upon a shaft 11, which is preferably supported in jewel-bearings, as is usual in instruments of this class, and in order that the armature may be properly balanced on the shaft we cut out a segmental portion 12 on the side having the greater radii. If this is not sufficient to properly balance the armature, we affix to it on the opposite side of the shaft a suitable weight 13. The outer end of the shaft is provided with a hand or pointer 14, which coöperates with a suitable dial-plate 15 on the plate 4, as is usual in this class of instruments.

16 is a spiral spring connecting the shaft 11 with a bearing-bracket 17 and is of such composition and strength as to exert the desired degree of force in opposition to the rotative effect imparted by the current in the coils 8 and 9.

18 is a permanent magnet, between the poles of which the armature 10 projects and which coöperates with such armature in a manner well understood in the art to make the instrument dead-beat.

In order to adapt the instrument to different current frequencies, we employ a non-inductive resistance-coil 19, which may be located at any convenient point and supported in any manner desired. In the drawings we have shown such coil as clamped to the inner side of plate 4. In order to prevent self-induction, one half of coil 19 should be reversely wound with reference to the other half.

An instrument having the features thus far described may be employed for measuring either current or electromotive force, provided the coils are properly constructed as regards material and the size and length of wire and so connected in circuit as to conform to the conditions imposed by the particular service for which the instrument is desired.

In case the instrument is designed and constructed to measure the amount of current flowing at any given instant in the circuit with which its coil 8 is connected we employ a resistance-coil 19, made of copper or some other material the temperature coefficient of which is at least as great as that of the material of which the disk 10 is made. This coil should be wound non-inductively and connected in shunt to the coil 8, as indicated in Fig. 4. Without the coil 19 the meter would read too high with a high frequency of alternations and too low with a low frequency of alternations, since the difference of potential between the terminals of coil 8 increases with an increase in the rate of alternations and decreases with a decrease in the rate of alternations. If the non-inductive coil 19 be connected in shunt to the coil 8, however, the difference of potential between its terminals will remain substantially constant for all frequencies, from which it follows that as the rate of alternations increases the coil 8 will take less and the coil 19 more current. On the other hand, as the rate of alternations decreases the coil 8 will take more and the coil 19 less current. By properly proportioning these coils the torque exerted upon the disk may therefore be made substantially independent of changes in the rate of alternations. As has already been stated, the shunt should have a temperature coefficient at least as high as that of the disk, so that as the heat of the disk tends to decrease the torque exerted upon it on account of the increased resistance the shunt-coil will become heated, and will therefore take less current, thus forcing more current through the coil 8 to compensate for the effect of heat in the disk.

Inasmuch as certain features of our invention are equally adapted to and useful in instruments for measuring current and instruments for measuring electromotive force, such features are claimed herein without limitation as regards the specific use to which the instrument may be put; but no claim is made to any feature that distinctively pertains to electromotive-force-measuring instruments.

It will be understood that our invention is not limited to the specific details illustrated in the drawings as regards either the number and location of parts or the structure of the same except in so far as limitations are imposed by the requisites for successful operation by the terms of the claims and by the prior art.

We claim as our invention—

1. In an electrical measuring instrument, the combination with a laminated core having an air-gap, of a primary actuating-coil, a secondary coil, a disk armature having radii of different length, an indicating hand or pointer and a spring tending to hold said armature and pointer at the zero position.

2. In an electrical measuring instrument, the combination with a laminated core having an air-gap, of a primary coil, a closed secondary coil, a rotatable disk armature having radii of different length and projecting into said air-gap a maximum distance when in its zero position, means tending to hold the armature at the zero position, and means for indicating the degree of rotation.

3. In an electrical measuring instrument, the combination with a laminated core having an air-gap, of a primary coil and a secondary coil adjacent to such air-gap, a rotatable disk armature having a periphery in the form of one turn of a spiral and projecting into said air-gap, means for indicating the degree of movement of the armature, and means tending to hold it in its zero position.

4. In an electrical measuring instrument, the combination with a primary coil and a closed secondary coil, of a disk armature having a spiral periphery and projecting into the shifting magnetic field produced by the currents in said coils, means for indicating the degree of movement of the armature and means for opposing such movement.

5. In an electrical measuring instrument, the combination with a primary coil and a relatively-displaced closed secondary coil, of a rotatable disk armature, means for opposing such movement, and means for adapting the instrument to differences in current frequencies.

6. In an electrical measuring instrument, the combination with a primary coil and a relatively-displaced closed secondary coil, of a rotatable disk armature in inductive relation to said coils, means for indicating the degree of movement of said armature, and a non-inductive resistance-coil for adapting the instrument to different frequencies.

7. In an electrical measuring instrument, the combination with actuating-coils constructed and arranged to produce a shifting magnetic field, of an armature or secondary member consisting of a disk having a periphery in the form of one turn of a spiral and projecting into said shifting field, and means for indicating the degree of movement of said armature.

8. In an electrical measuring instrument, the combination with actuating-coils constructed and arranged to produce a shifting magnetic field, and a disk armature having a spiral periphery and provided with balancing means, of means for indicating the degree of movement of the armature.

9. In a measuring instrument for alternating electric currents, the combination with a closed-circuit movable member and means for indicating the extent of its movement, of an actuating-magnet and a non-inductive resistance in shunt to said magnet whereby the instrument is adapted to different frequencies of alternations.

10. In a measuring instrument for alternating electric currents, the combination with a closed-circuit movable member and means for indicating the extent of its movement against an opposing force, of an actuating-magnet and a non-inductive resistance having a temperature coefficient at least as great as that of the movable member and connected in shunt to the actuating-magnet to compensate for changes in current frequency and in temperature.

11. In an electrical measuring instrument, the combination with a laminated core having an air-gap, of a primary actuating-coil and one or more closed secondary coils on said core, the secondary coil or coils being laterally displaced with reference to said primary coil, a disk armature projecting into said air-gap, an indicating device and means tending to hold said armature and indicating device at the zero position.

12. In an electrical measuring instrument, the combination with a laminated core having an air-gap, of a primary coil surrounding one arm of the core adjacent to the air-gap, a closed secondary coil surrounding a portion of each arm of the core, a disk armature projecting into the air-gap, an indicating device and means tending to hold the armature and the indicating device at the zero position.

In testimony whereof we have hereunto subscribed our names this 5th day of May, 1898.

HARRY P. DAVIS.
FRANK CONRAD.

Witnesses:
WESLEY G. CARR,
HUBERT C. TENER.